(12) United States Patent
Suchkov et al.

(10) Patent No.: US 11,140,864 B2
(45) Date of Patent: Oct. 12, 2021

(54) TOILET FOR HOUSEHOLD PETS

(71) Applicants: Egor Gennadevich Suchkov, Moscow (RU); Tamara Petrovna Savchenko, Moscow (RU)

(72) Inventors: Egor Gennadevich Suchkov, Moscow (RU); Tamara Petrovna Savchenko, Moscow (RU)

( * ) Notice: Subject to any disclaimer, the term of this patent is extended or adjusted under 35 U.S.C. 154(b) by 188 days.

(21) Appl. No.: 16/606,161

(22) PCT Filed: Apr. 11, 2018

(86) PCT No.: PCT/RU2018/000229
§ 371 (c)(1),
(2) Date: Oct. 17, 2019

(87) PCT Pub. No.: WO2018/194489
PCT Pub. Date: Oct. 25, 2018

(65) Prior Publication Data
US 2020/0120892 A1    Apr. 23, 2020

(30) Foreign Application Priority Data
Apr. 18, 2017 (RU) .......................... RU2017113405

(51) Int. Cl.
*A01K 1/01* (2006.01)
*A01K 1/015* (2006.01)

(52) U.S. Cl.
CPC ............ *A01K 1/011* (2013.01); *A01K 1/0157* (2013.01)

(58) Field of Classification Search
CPC ........ A01K 1/011; A01K 1/0157; A01K 1/01; A01K 1/0107; A01K 1/0135; A01K 1/0117; A01K 23/005
See application file for complete search history.

(56) References Cited

U.S. PATENT DOCUMENTS 4,376,365 A * 3/1983 Moertel .................... B65B 9/02
                                                          53/555
5,279,258 A * 1/1994 Kakuta ................ A01K 1/0117
                                                          119/163
(Continued)

FOREIGN PATENT DOCUMENTS

JP      2005040016 A    2/2005
RU        139051 U1     4/2014

OTHER PUBLICATIONS

PCT Search Report for PCT/RU2018/000229 dated Aug. 9, 2018.

*Primary Examiner* — Trinh T Nguyen
(74) *Attorney, Agent, or Firm* — Pequignot + Myers; Matthew A. Pequignot

(57) ABSTRACT

A toilet for household pets comprises a housing having a horizontal platform, a film-moving mechanism having two axes installed in said housing on opposite transverse sides of the platform, and a winding drive that moves a clean film onto the platform from a roll installed on the first axis, and moves the film with the excrement along the platform to a roll installed on the second axis, and film-securing devices which are installed in the housing on opposite longitudinal side of the platform and designed to be capable of clamping and unclamping opposite edges of the film, respectively, for securing the film disposed in a stationary position on the platform and for the unhindered passage of the film moved along the platform. The first and second axes of the mechanism for moving the film are arranged and designed to be capable of tensioning the film and pressing same against the platform be means of the winding drive, wherein the film from the roll on the first axis in lifted to the platform and lowered from the platform to the roll on the second axis.

15 Claims, 2 Drawing Sheets

(56) References Cited

U.S. PATENT DOCUMENTS

| | | |
|---|---|---|
| 7,958,846 B2 | 6/2011 | Axelrod et al. |
| 10,729,096 B2 * | 8/2020 | Orgias ................ H01M 10/488 |
| 2004/0065265 A1 * | 4/2004 | Manera ................ A01K 1/0114 |
| | | 119/166 |
| 2009/0241850 A1 | 1/2009 | Campbell et al. |
| 2014/0311414 A1 | 10/2014 | Morris |
| 2016/0007560 A1 | 1/2016 | Roofener |
| 2018/0192612 A1 * | 7/2018 | Lindvall .............. A01K 1/0157 |
| 2020/0359594 A1 * | 11/2020 | Tohara ................ A01K 1/0107 |

* cited by examiner

TOILET FOR HOUSEHOLD PETS

RELATED APPLICATION DATA

This application is the national stage entry of International Appl. No. PCT/RU2018/000229, filed Apr. 11, 2018, which claims priority to Russian Patent Application No. RU2017113405 filed Apr. 18, 2017. All claims of priority to that application are hereby made, and that application is hereby incorporated in its entirety by reference.

TECHNICAL FIELD

The present invention relates to excrement and urine collection devices, and, more specifically, to pet toilets.

BACKGROUND ART

Pet toilets of various designs are known in the art. There is a distinct group comprised of designs wherein excrements are collected using a pad rolled-up on one axle and moved onto a platform, i.e. the toilet bottom, and then moved, with the excrements on it, along the platform and rolled, with the excrements on it, on another axle.

As an example, Patent Application U.S. 2009241850, published Jan. 10, 2009, discloses a pet toilet comprising a housing having a horizontal platform and a pad movement mechanism having two axles installed in the housing at opposing transverse sides of the platform and a take-up actuator that moves the clean pad rolled on the first axle onto the platform and moves the excrement-soiled pad along the platform into a roll on the second axle. This known design is the prior art closest to the first embodiment of the claimed invention.

The known pet toilet is disadvantageous in that the pad is not adequately retained on the platform. As is known, domestic animals (a cat or a dog) first "dig", with their paws, a spot to fulfill their natural needs and subsequently "bury" their excrements. Thus, the animals will tear the pad off the platform by creasing the pad and pulling it from under a guide roller. Position of the pad on the platform will have to be restored each time after an animal has utilized the toilet and prior to the excrement-soiled pad movement along the platform to be rolled up on the second axle by the take-up actuator. As such, the advantage of easy disposal of excrements through this design will not be accomplished. Furthermore, as the elevations of the roll axles are higher than that of the platform, excrements may slide back to the platform instead of being rolled.

Another known animal litter device disclosed in U.S. Pat. No. 7,958,846 dd. 14.06.2011 comprises a horizontal platform, a microprocessor-based control unit, a pad movement mechanism having two axles installed in the housing at opposing transverse sides of the platform and connected to the microprocessor via an electrical take-up actuator that moves the clean pad rolled on the first axle onto the platform and moves the excrement-soiled pad along the platform into a roll on the second axle, and a sensor of animal presence on the platform connected to the microprocessor. This known design is the prior art closest to the second embodiment of the claimed invention.

This known pet litter device is disadvantageous in that the pad is not adequately retained on the platform. Position of the pad on the platform will have to be restored each time after an animal has utilized the litter device. As such, the advantage of automatic disposal of excrements through this design will not be accomplished. Furthermore, as the elevations of the roll axles are higher than that of the platform, excrements slide back to the platform instead of being rolled. The claimed design is aimed at retaining the pad when positioned on the platform and at maintaining the roll shape when taking-up the excrement-soiled pad.

SUMMARY OF INVENTION

The technical result accomplished by the claimed invention is to prevent the pad from creasing and displacement from the position required for excrement collection. This technical result is provided as follows: first, by tensioning the pad along the platform when the pad is being moved or stopped, second, by holding the pad down to the platform when the pad between the rolls is being moved or stopped, and, third, by retaining the pad position across the platform when the pad is stopped. By doing these, the pad is at all time held down to the platform and is tensioned, and the pad section on the platform, which is subjected to the animal paw action when the pad is stopped, is retained in three mutually perpendicular directions, thus preventing the pad from creasing.

Said technical results are provided by a pet toilet, comprising: a housing having a horizontal platform, a pad movement mechanism having two axles installed in the housing at opposing transverse sides of the platform and a take-up actuator that moves a clean pad onto the platform from a roll installed on a first axle and moves an excrement-soiled pad along the platform into a roll installed on a second axle, and pad retainers installed in the housing at opposing longitudinal sides of the platform and configured for locking and releasing the opposing edges of the pad to retain the pad when it is at rest on the platform and to let it freely pass when being moved along the platform, respectively, and the first and second axles of the pad movement mechanism arranged and configured to tension the pad and to hold it down to the platform by the take-up actuator, so the pad from the roll on the first axle being lifted onto the platform and lowered from the platform into the roll on the second axle.

The take-up actuator may be electrical.

The first axle may be provided with a position retainer to lock it in its position when the take-up action is terminated, and the second axle is provided with a reversing lock. The first axle position retainer may be provided with an electrical actuator.

Pad retainers installed in the housing at opposing longitudinal sides of the platform may also be provided with electrical actuators.

The toilet may be provided with an electrical actuators control panel and/or may be remotely controllable via radio signals.

The two axles and the pad retainers may be provided with covers mounted on the housing with a clearance to the pad and bordering the platform at its transverse and longitudinal sides, respectively. The cover covering the second axle with the roll formed by the excrement-soiled pad may be provided with a shutter that closes the clearance between the cover and the pad positioned between the platform and the roll on the second axle and is installed such as to lift and open the clearance when the pad is being moved from the platform into the roll on the second axle.

The second axle may be coupled to the take-up actuator via a toothed gear. The two axles may have their ends seated in grooves formed in the housing and curved such as to prevent the axles with the rolls from rising out of the grooves when the pad is being tensioned by the take-up actuator.

Said technical results are further provided by a pet toilet, comprising: a housing having a horizontal platform, a microprocessor-based control unit, a pad movement mechanism having two axles installed in the housing at opposing transverse sides of the platform and connected to the microprocessor an electrical take-up actuator that moves a clean pad onto the platform from a roll installed on a first axle and moves an excrement-soiled pad along the platform into a roll installed on a second axle, pad retainers installed in the housing at opposing longitudinal sides of the platform and provided with an electrical actuator connected to the microprocessor for locking and releasing the opposing edges of the pad to retain the pad when it is at rest on the platform and to let it freely pass when being moved along the platform, respectively, a sensor of animal presence on the platform connected to the microprocessor controlling the electrical actuators, and the first and second axles of the pad movement mechanism arranged and configured to tension the pad and to hold it down to the platform by the electrical take-up actuator, so the clean pad from the first axle being lifted onto the platform during the take-up action and the excrement-soiled pad being lowered from the platform into the roll on the second axle.

The horizontal platform may be mounted in the housing on a springing base, and the sensor of animal presence on the horizontal platform is a limit switch.

The first axle of the pad movement mechanism may be provided with an electrically-actuated retainer, and the second axle is provided with a reversing lock. To maintain the pad tension at all times (both when being taken-up and when stopping), the first axle friction factor may be higher than the second axle friction factor when they are rotated during the pad movement by the take-up actuator. The first axle will, therefore, "slow down", thus tensioning the pad during the take-up action.

The two axles and the pad retainers may be provided with covers mounted on the housing with a clearance to the pad and bordering the platform at its transverse and longitudinal sides, respectively. The cover covering the second axle with the roll formed by the excrement-soiled pad may be provided with a shutter driven by an electrical actuator connected to the microprocessor to close the clearance between the cover and the pad positioned between the platform and the roll on the second axle and to open the clearance when the pad is being moved from the platform into the roll on the second axle. The second axle may be coupled to the take-up actuator via a toothed gear. The two axles may have their ends seated in grooves formed in the housing and curved such as to prevent the axles with the rolls from rising out of the grooves when the pad is being tensioned by the take-up actuator.

BEST MODE FOR CARRYING OUT THE INVENTION

Figure 1:
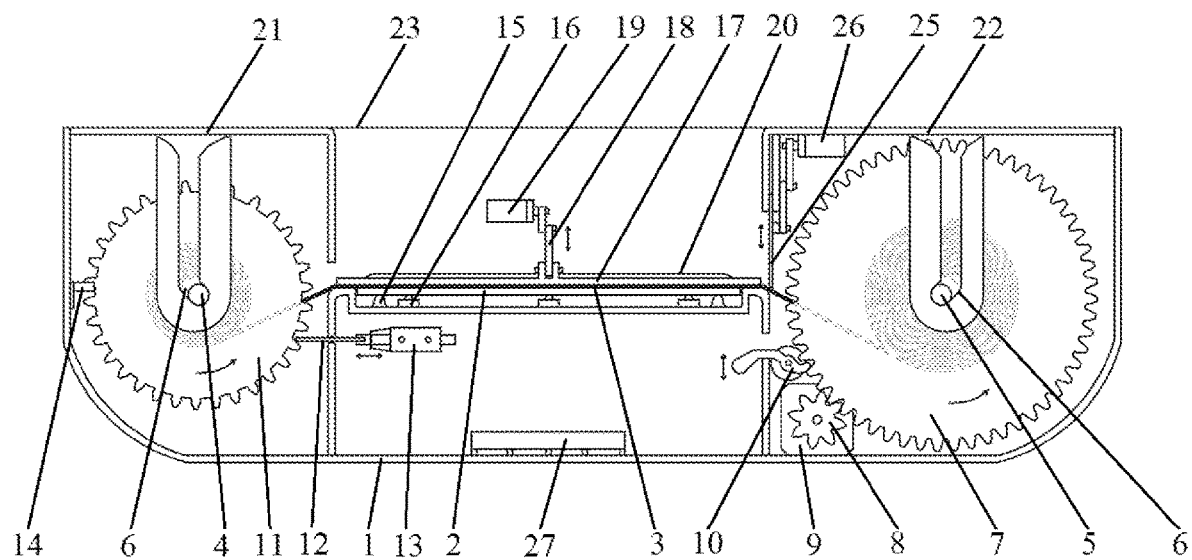
FIG. 1 is a longitudinal sectional view of the pet toilet.
Figure 2:
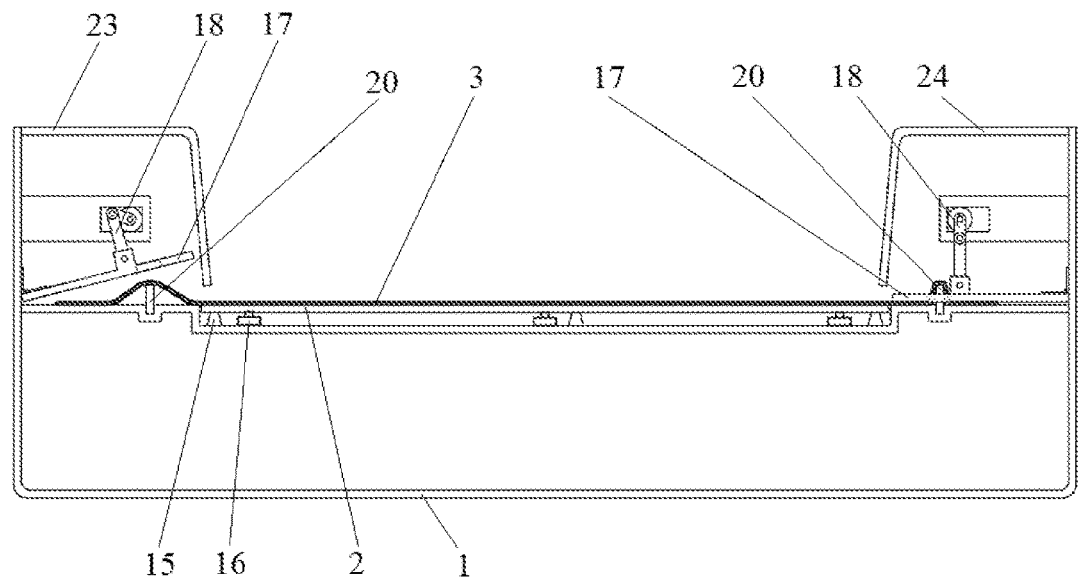
FIG. 2 is a cross-sectional view of the pet toilet.

FIG. 1 and FIG. 2, which are a longitudinal sectional view and a cross-sectional view of a pet toilet, respectively, show a housing 1 with a horizontal platform 2 and a pad 3 arranged on the latter. A first axle 4 and a second axle 5 are seated in grooves 6 of the housing 1 at opposing transverse sides of the platform 2. The grooves 6 are curved such as to prevent the axles with rolls in the grooves 6 from rising when the pad 3 is being tensioned by the pad movement mechanism. A toothed wheel 7 is mounted on the second axle 5 and is engaged with a cogwheel 8 mounted on a shaft of a motor 9, such as a step motor. The toothed wheel 7 further has a stopper (pawl) 10.

A toothed wheel 11 is mounted on the first axle 4 and is provided with a retainer 12 driven by a solenoid 13 and a sensor 14 for sensing the toothed wheel 11 rotation. The sensor 14 may, for example, be a light emitting sensor signaling the passage of each tooth of the toothed wheel 11. Consumption of the pad from the roll on the first axle may be controlled using data on the step motor 9 shaft rotation.

The horizontal platform 2 is mounted in the housing 1 on springs 15 and is provided with limit switches 16.

The pad retainers installed in the housing 1 at opposing longitudinal sides of the platform 2 and configured for locking and releasing the opposing edges of the pad 3 to retain the pad when it is at rest on the platform and to let it freely pass when being moved along the platform 2, respectively, are each provided with a plate 17 rotatably mounted on the housing 1 in front of the horizontal platform 2 longitudinal side and an actuator with a mechanism 18 and a motor 19. The actuator, via the plate 17, holds the pad 3 down to the housing 1 surface. As such, the plate 17 has a slot to which a projection 20, formed on the housing surface, extends together with the pad 3 when the plate 17 is lowered, as shown in FIG. 2. This ensures reliable retention of the pad 3 position on the horizontal platform 2, the pad 3 is being tensioned in a crosswise direction. The surface of the housing 1, to which the pad 3 is held down by the plate 17, is parallel to the platform 2 surface, such as is flush with it or somewhat lower than it when an animal is present on the platform, for the retainers to hold the pad 3 down to the platform 2 surface.

The axles 4 and 5 and the pad retainers are provided with covers 21, 22, 23, and 24, respectively, mounted on the housing with a clearance to the pad and bordering the horizontal platform at its transverse and longitudinal sides, respectively. The cover 22 covering the second axle 5 with the roll formed by the excrement-soiled pad is provided with a shutter 25 that closes the clearance between the cover 22 and the pad 3 positioned between the platform and the roll on the second axle 5 and is installed such as to lift and open the clearance, by the actuator 26, when the pad 3 is being moved from the platform 2 into the roll on the second axle 5.

In a first embodiment of the invention, all the actuators, i.e. the take-up actuator, the first axle retaining actuator, the pad retainer actuator, and the shutter actuator may be of manual type. Herein, no sensors are needed. However, the first embodiment of the invention allows for the device to be automated, i.e. for all or some of the actuators to be electrical and to be provided with an actuator control panel. In one embodiment, the toilet may be remotely controlled. This is to be done using a watching camera that enables on-line monitoring of the toilet condition via the Internet and remote control of the actuators.

In a second embodiment of the invention, the toilet is automatic and is provided with a microprocessor (controller) 27 controlling the actuators based on data from sensors. A possible algorithm of the toilet operation is described below.

If the limit switches 16 trip and remain in such position longer than 20 seconds, after the limit switches 16 have turned off (an animal has left the platform 2), the microprocessor turns on a timer counting down the time to the start of taking the pad up onto the second axle. Where the timer is set, for example, to 30 seconds, and the limit switches trip again (the animal is back on the platform 2) before the 30-second period after they were turned off elapses, the timer stops counting down the time to the start of taking-up action and resets to zero. After the limit switches 16 turning off (the animal has left the platform 2 again), the timer is re-started. After the timer has counted down the 30-second period, the microprocessor turns on the first axle retaining actuator (the solenoid retracts the plunger, thus releasing the first axle), the actuators retaining the pad on the platform 2 (the actuators lift the plates 17) and the shutter lifting actuator, and then, e.g. after 1 second, turns on the take-up actuator.

Figure 3:
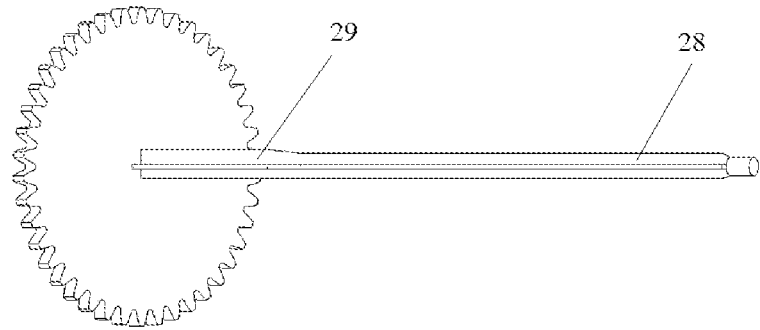
FIG. 3 shows an axle onto which a pad roll core is placed.

Where, during the taking-up action, the switches 16 trip again (the animal has returned to the platform 2 during the taking-up action), the take-up actuator turns off, the retainers block the first axle and lock the pad by holding it down to the platform 2. When the animal has left the platform 2 again, the take-up actuator is turned on by the microprocessor, e.g. after 5 seconds and 1 second after turning on the first axle and the pad retaining actuators. After the pad taking-up action termination after a preset time period or after the first axle has rotated to a preset angle according to the sensor output, or after the second axle rotation in accordance with controlled rotation of the shaft of the step motor driving the second axle, the retainers block the first axle and lock the pad by holding it down to the platform 2, and the shutter closes. The above methods of controlling the pad consumption, i.e. reduction of the size of the clean pad roll on the first axle, enable the microprocessor to signal, e.g. via a source of light or sound, the need to replace the roll on the first axle and to remove the excrement-soiled roll from the second axle. It will be appreciated that remote signaling may also be provided. The toilet design provides for replacing the clean pad roll on the first axle and removing the excrement-soiled roll from the second axle not by replacing the axles, but by installation onto the axles and subsequent removal from the axles of cores made, for example, from cardboard, on which cores the rolls of clean pad and excrement-soiled pad are arranged, respectively. As shown in FIG. 3, the axle is provided with longitudinal ribs, the height of one of the ribs 28 being increased at a portion 29 of the axle. Due to the presence of the ribs and the increased height of at least one of them, when the cardboard core is being placed onto the axle, the core undergoes deformation that prevents it from rotating about the axle when the pad is being tensioned. Preferably, the pad employed in the claimed device is elastic. The pad is to absorb moisture, while not letting it leak. Such pad may be comprised of three layers, e.g.:

a top layer comprised of a thin nonwoven material (Spunbond) or a thick nonwoven material (Spunbond) with small perforations;

a central layer comprised of cellulose (cotton wool);

a bottom layer comprised of a thick nonwoven material (Spunbond) or thick polyethylene.

The invention claimed is:

1. A pet toilet, comprising: a housing having a horizontal platform and a pad movement mechanism having two axles installed in the housing at opposing transverse sides of the platform and a take-up actuator that moves a clean pad onto the platform from a roll installed on a first axle and moves an excrement-soiled pad along the platform into a roll installed on a second axle, characterized in that it further includes pad retainers installed in the housing at opposing longitudinal sides of the platform and configured for locking and releasing the opposing edges of the pad to retain the pad when it is at rest on the platform and to let it freely pass when being moved along the platform, respectively, and the first and second axles of the pad movement mechanism arranged and configured to tension the pad and to hold it down to the platform by the take-up actuator, herewith the pad from the roll on the first axle being lifted onto the platform and lowered from the platform into the roll on the second axle.

2. The toilet of claim 1, characterized in that the pad retainers installed in the housing at opposing longitudinal sides of the platform are configured for crosswise tension of the pad when it is at rest on the platform.

3. The toilet of claim 1, characterized in that the take-up actuator is electrical.

4. The toilet of claim 3, characterized in that the first axle is provided with a position retainer to lock it in its position when the take-up action is terminated, and the second axle is provided with a reversing lock.

5. The toilet of claim 4, characterized in that the first axle position retainer is provided with an electrical actuator.

6. The toilet of claim 3, characterized in that the pad retainers installed in the housing at opposing longitudinal sides of the platform are provided with electrical actuators.

7. The toilet of claim 6, characterized in that it is provided with an electrical actuators control panel.

8. The toilet of claim 6, characterized in that it is remotely controllable via radio signals.

9. The toilet of claim 1, characterized in that the two axles and the pad retainers are provided with covers mounted on the housing with a clearance to the pad and bordering the platform at its transverse and longitudinal sides, respectively, and the cover covering the second axle with the roll formed by the excrement-soiled pad is provided with a shutter that closes the clearance between the cover and the pad positioned between the platform and the roll on the second axle and is installed such as to lift and open the clearance when the pad is being moved from the platform into the roll on the second axle.

10. The toilet of claim 1, characterized in that the second axle is coupled to the take-up actuator via a toothed gear, and the two axles have their ends seated in grooves formed in the housing and curved such as to prevent the axles with the rolls from rising out of the grooves when the pad is being tensioned by the take-up actuator.

11. A pet toilet, comprising: a housing having a horizontal platform, a microprocessor-based control unit, a pad movement mechanism having two axles installed in the housing at opposing transverse sides of the platform and connected to the microprocessor via an electrical take-up actuator that moves a clean pad onto the platform from a roll installed on a first axle and moves an excrement-soiled pad along the platform into a roll installed on a second axle, and a sensor of animal presence on the platform connected to the microprocessor controlling the electrical actuators, characterized in that it further includes pad retainers installed in the housing at opposing longitudinal sides of the platform and provided with an electrical actuator connected to the microprocessor for locking and releasing the opposing edges of the pad to retain the pad when the pad is at rest on the platform and to let the pad freely pass when being moved along the platform, respectively, and the first and second axles of the pad movement mechanism arranged and configured to tension the pad and to hold the pad down to the platform by the electrical take-up actuator, herewith the pad from the roll on the first axle being lifted onto the platform and lowered from the platform into the roll on the second axle.

12. The toilet of claim 11, characterized in that the horizontal platform is mounted in the housing on a springing base, and the sensor of animal presence on the horizontal platform is a limit switch.

13. The toilet of claim 11, characterized in that the first axle of the pad movement mechanism is provided with an electrically-actuated retainer, and the second axle is provided with a reversing lock.

14. The toilet of claim 11, characterized in that the two axles and the pad retainers are provided with covers mounted on the housing with a clearance to the pad and bordering the platform at its transverse and longitudinal sides, respectively, and the cover covering the second axle with the roll formed by the excrement-soiled pad is provided with a shutter driven by an electrical actuator connected to the microprocessor to close the clearance between the cover and the pad positioned between the platform and the roll on the second axle and to open the clearance when the pad is being moved from the platform into the roll on the second axle.

15. The toilet of claim 11, characterized in that the second axle is coupled to the take-up actuator via a toothed gear, and the two axles have their ends seated in grooves formed in the housing and curved such as to prevent the axles with the rolls from rising out of the grooves when the pad is being tensioned by the take-up actuator.

\* \* \* \* \*